United States Patent
Adams et al.

(10) Patent No.: US 7,627,757 B2
(45) Date of Patent: Dec. 1, 2009

(54) MESSAGE SERVICE INDICATION SYSTEM AND METHOD

(75) Inventors: Neil P. Adams, Waterloo (CA); Michael S. Brown, Waterloo (CA); Herbert A. Little, Waterloo (CA)

(73) Assignee: Research In Motion Limited, Waterloo (CA)

( * ) Notice: Subject to any disclaimer, the term of this patent is extended or adjusted under 35 U.S.C. 154(b) by 842 days.

(21) Appl. No.: 11/066,406

(22) Filed: Feb. 25, 2005

(65) Prior Publication Data

US 2005/0246535 A1 Nov. 3, 2005

Related U.S. Application Data

(60) Provisional application No. 60/566,772, filed on Apr. 30, 2004.

(51) Int. Cl.
*H04L 9/32* (2006.01)
*G06F 3/14* (2006.01)
*G06F 3/048* (2006.01)
*H04L 29/06* (2006.01)
*G06F 17/30* (2006.01)

(52) U.S. Cl. ............... 713/166; 713/170; 726/31; 709/206; 715/864; 715/784; 715/787; 715/708

(58) Field of Classification Search .............. 713/166, 713/170; 726/31; 709/206; 715/864, 784, 715/787, 708

See application file for complete search history.

(56) References Cited

U.S. PATENT DOCUMENTS

| 5,949,432 | A  | * | 9/1999 | Gough et al. | 345/629 |
|---|---|---|---|---|---|
| 6,615,242 | B1 | * | 9/2003 | Riemers | 709/206 |
| 6,931,532 | B1 | * | 8/2005 | Davis et al. | 713/167 |
| 7,190,518 | B1 | * | 3/2007 | Kleinberger et al. | 359/465 |
| 7,475,242 | B2 | * | 1/2009 | Baird et al. | 713/166 |
| 2002/0154141 | A1 | * | 10/2002 | Forman | 345/626 |
| 2003/0120949 | A1 | * | 6/2003 | Redlich et al. | 713/200 |
| 2003/0128234 | A1 | * | 7/2003 | Brown et al. | 345/744 |
| 2004/0177120 | A1 | * | 9/2004 | Kirsch | 709/206 |

(Continued)

FOREIGN PATENT DOCUMENTS

EP 1265182 12/2002

(Continued)

OTHER PUBLICATIONS

Computing Services, Institute of Education, University of London. "OUTLOOK 2000 Intermediate—Part 2", May 2001.*

(Continued)

*Primary Examiner*—Michael J Simitoski
(74) *Attorney, Agent, or Firm*—Jones Day; Krishna K. Pathiyal; Robert C. Liang

(57) ABSTRACT

Systems and methods for displaying messages to a user, the messages having different levels of security, are provided herein. One method of displaying to a user messages having different levels of security includes receiving a message over a network includes examining an attribute of the message to determine a security-related level associated with the message. A visual indication for display to a device user is generated by the device. Such visual indication is indicative of the determined security-related level, and is configured to be visible during scrolling through a majority of the message text.

25 Claims, 12 Drawing Sheets

U.S. PATENT DOCUMENTS

2005/0246420 A1* 11/2005 Little .......................... 709/204

FOREIGN PATENT DOCUMENTS

WO  WO 03/075530  9/2003

OTHER PUBLICATIONS

Research in Motion Limited. BlackBerry Security with the S/MIME Support Package version 1.5, 2003.*

Sems, Marty. "Verifying Identity In a Digital World", Aug. 2000.*

Slovak, Ken. Absolute Beginner's Guide to Microsoft Office Outlook 2003, Oct. 1, 2003.*

International Search Report of Application No. PCT/CA2005/000276, date of mailing May 26, 2005-11 pgs.

Syroid, Tom, "Outlook 2000 in a Nutshell", 2000, pp. 205-207, 244-261 and 508-512. Sebastopol, CA: O'Reilly & Associates.

Kelly, Julia, "How to do Everything with Outlook 2000", 2000, pp. 110-111 and 159-164. Berkeley, CA: Osborne/McGraw-Hill.

Article 94(3) EPC Communication, issued Feb. 12, 2008 by EPO, for European Application No. EP05714151.8.

"PGP Freeware for Windows 95, Windows 98, Windows NT, Windows 2000 & Windows Millennium User's Guide", Version 7.0, pp. 1-47, XP002286313, (2001).

* cited by examiner

MESSAGE SERVICE INDICATION SYSTEM AND METHOD

CROSS-REFERENCE TO RELATED APPLICATION

This application claims the benefit of and priority to, and incorporates by reference in its entirety for all purposes, commonly assigned U.S. Provisional Application having Ser. No. 60/566,772, filed on Apr. 30, 2004, entitled "MESSAGE SERVICE INDICATION SYSTEM AND METHOD."

BACKGROUND

1. Technical Field

The present invention relates generally to the field of communications, and in particular to indicating message services on computing devices.

2. Description of the Related Art

Some government agencies have multiple networks, each with different degrees of security. Messages received in a top-security network are typically more important than messages received in a non-secret network and should be treated by the receiver of the message differently.

Government officials that have accounts set up in more than one network would like to receive all of their e-mail messages on one mobile device, not multiple mobile devices (i.e., one for each network they are connected to). For this reason, they would like to easily and effectively be able to determine, among other things, from which network or e-mail server a message came. With such information, they are more likely to treat the message properly from a security aspect.

One approach could include showing in the first field when viewing the message which service the message is from. However, this field may not be visible when the user first opens the message, and the user would have to scroll to the top of the message, through all of the recipients, to view service source information.

SUMMARY

In accordance with the teachings disclosed herein, systems and methods are provided for displaying e-mail messages. As an example of a system and method, messages are displayed to a user wherein a security related level of the message is determined. A visual indication for display to a device user is generated based upon the determined security-related level. Such visual indication is configured to be visible through a majority of text associated with the message.

As another example, a data processing device can be configured for handling messages with different levels of security. A receiver can be configured to be operable to receive a message via a network, and security logic instructions can be configured to be operable to examine an attribute of the message and to determine a security-related level associated with the message. User interface logic instructions can generate a visual indication for display to a device user responsive to the determined security-related level associated with the message. The generated visual indication can be configured to be visible during scrolling through all or a majority of the message text.

As will be appreciated, the disclosed systems and methods are capable of different embodiments, and their details are capable of modifications in various respects. Accordingly, the drawings and description set forth below are to be regarded as illustrative in nature and not restrictive.

DETAILED DESCRIPTION OF THE DRAWINGS

Figure 1:
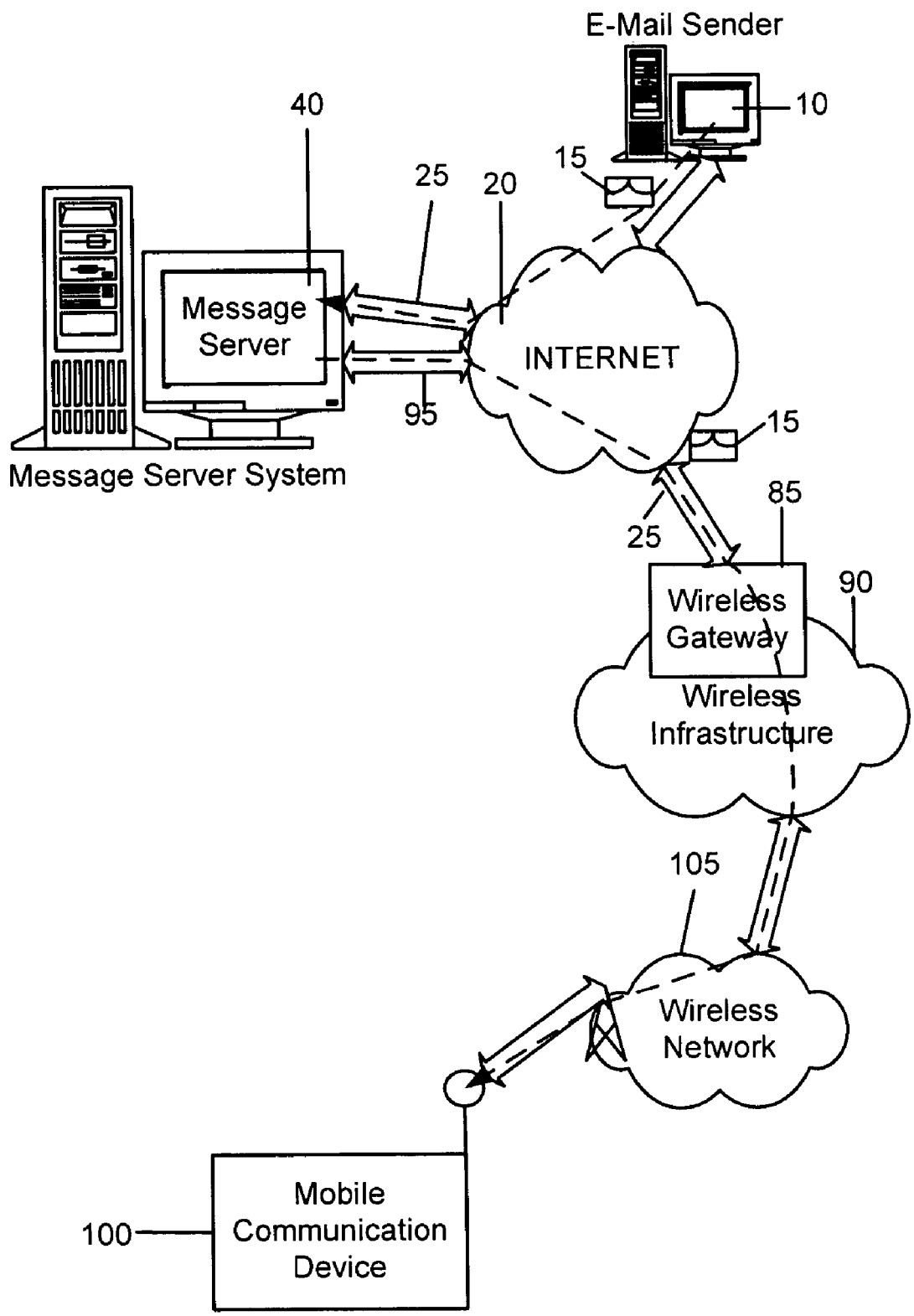
FIG. 1 is an overview of an example communication system in which a wireless communication device may be used.

FIG. 1 is an overview of an example communication system in which a wireless communication device may be used. One skilled in the art will appreciate that there may be hundreds of different topologies, but the system shown in FIG. 1 helps demonstrate the operation of the encoded message processing systems and methods described in the present application. There may also be many message senders and recipients. The simple system shown in FIG. 1 is for illustrative purposes only, and shows perhaps the most prevalent Internet e-mail environment where security is not generally used.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have predefined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 15 arrives at the message server 40 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or Ti connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
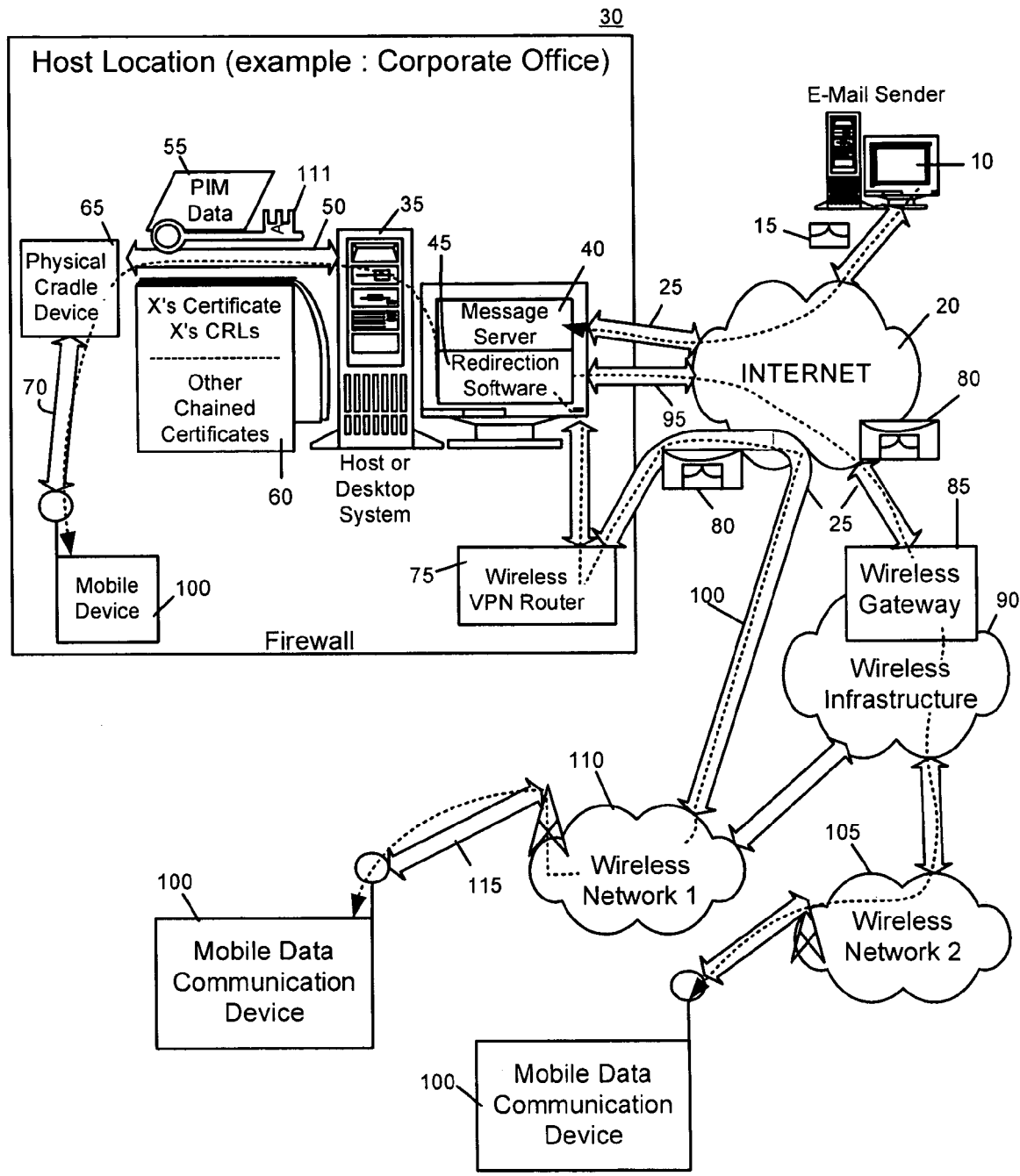
FIG. 2 is a block diagram of a further example communication system including multiple networks and multiple mobile communication devices.

FIG. 2 is a block diagram of a further example communication system including multiple networks and multiple mobile communication devices. The system of FIG. 2 is substantially similar to the FIG. 1 system, but includes a host system 30, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the encoded message processing systems and methods described herein may be applied to networks having many different topologies, the network of FIG. 2 is useful in understanding an automatic e-mail redirection system mentioned briefly above.

The central host system 30 will typically be a corporate office or other LAN, but may instead be a home office computer or some other private system where mail messages are being exchanged. Within the host system 30 is the message server 40, running on some computer within the firewall of the host system, that acts as the main interface for the host system to exchange e-mail with the Internet 20. In the system of FIG. 2, the redirection program 45 enables redirection of data items from the server 40 to a mobile communication device 100. Although the redirection program 45 is shown to reside on the same machine as the message server 40 for ease of presentation, there is no requirement that it must reside on the message server. The redirection program 45 and the message server 40 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694 ("the '694 patent"), entitled "System and Method for Pushing Information From A Host System To A Mobile Data Communication Device Having A Shared Electronic Address", and issued to the assignee of the instant application on Apr. 17, 2001, which is hereby incorporated into the present application by reference. This push technique may use a wireless friendly encoding, compression and encryption technique to deliver all information to a mobile device, thus effectively extending the security firewall to include each mobile device 100 associated with the host system 30.

As shown in FIG. 2, there may be many alternative paths for getting information to the mobile device 100. One method for loading information onto the mobile device 100 is through a port designated 50, using a device cradle 65. This method tends to be useful for bulk information updates often performed at initialization of a mobile device 100 with the host system 30 or a computer 35 within the system 30. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. The concept of a wireless VPN router 75 is new in the wireless industry and implies that a VPN connection could be established directly through a specific wireless network 110 to a mobile device 100. The possibility of using a wireless VPN router 75 has only recently been available and could be used when the new Internet Protocol (IP) Version 6 (IPV6) arrives into IP-based wireless networks. This new protocol will provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 40 and is redirected by the redirection program 45 to the mobile device 100. As this redirection takes place the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

With reference back to the port 50 and cradle 65 connectivity to the mobile device 100, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 111 such as an S/MIME or PGP specific private key, the Certificate (Cert) of the user and their Certificate Revocation Lists (CRLs) 60. The private key is preferably exchanged so that the desktop 35 and mobile device 100 share one personality and one method for accessing all mail. The Cert and CRLs are normally exchanged over such a link because they represent a large amount of the data that is required by the device for S/MIME, PGP and other public key security methods.

Figure 3:
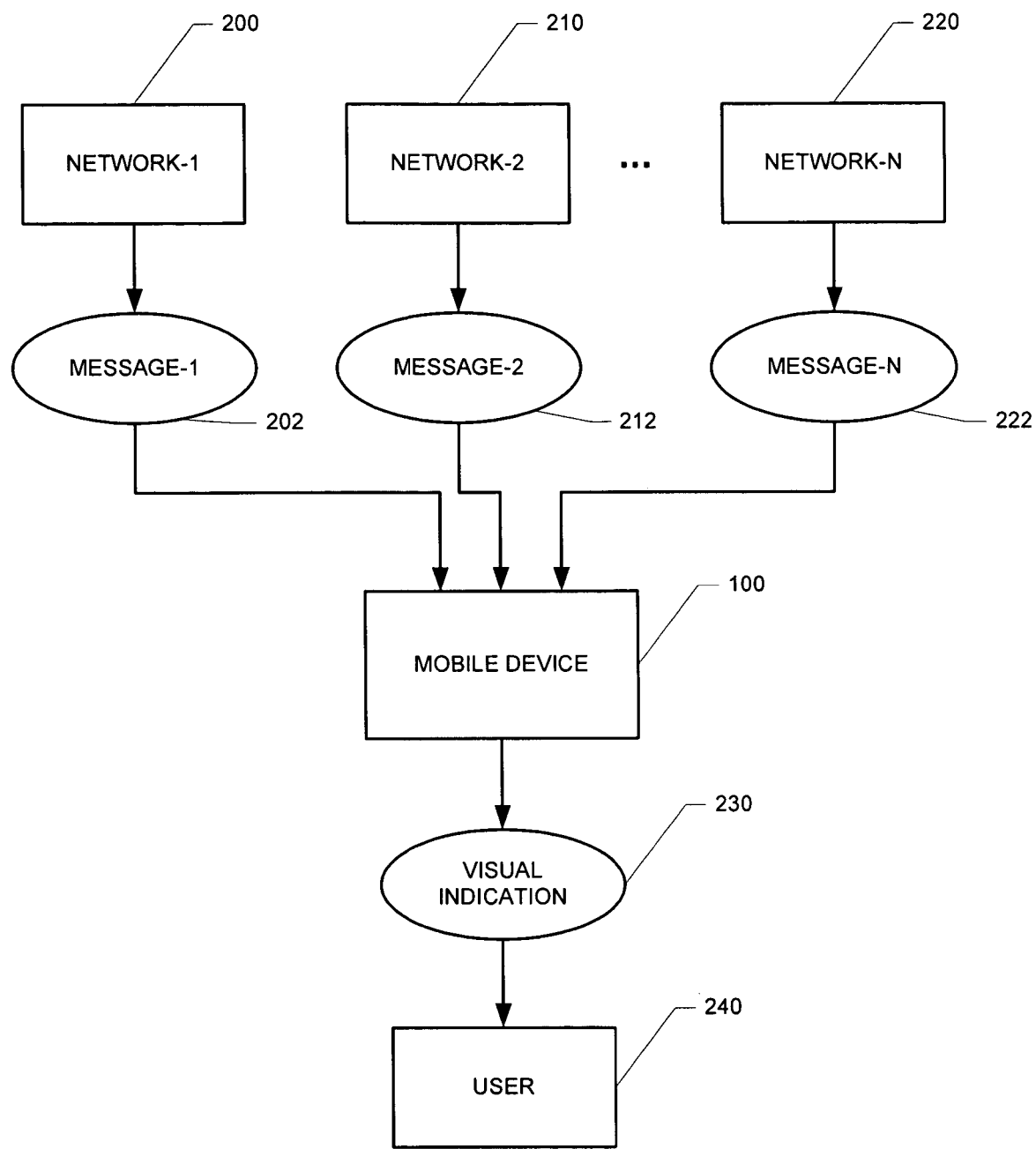
FIG. 3 is a block diagram depicting a mobile device receiving messages from multiple networks.

FIG. 3 depicts a mobile device 100 receiving messages (202, 212, 222) from multiple networks (200, 210, 220). The networks (200, 210, 220) can have different degrees of security. The mobile device 100 generates a visual indication 230 for display to the device's user 240 that indicates what degree of security or sensitivity is associated with a message.

Figure 4:
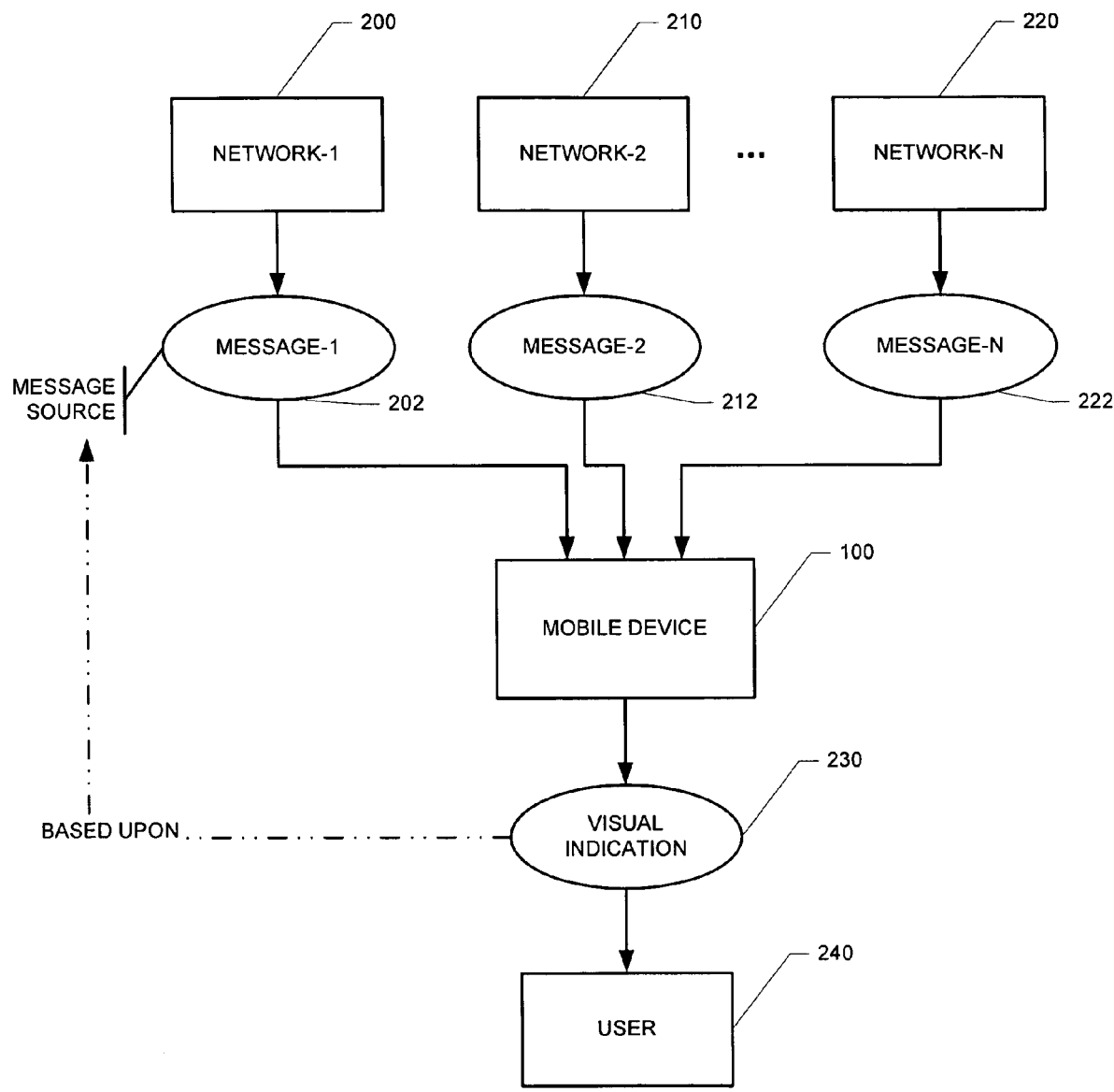
FIG. 4 is a block diagram depicting a visual indication being based upon the source of the message.

For example, FIG. 4 illustrates that a visual indication 230 can be based upon the source of the message. This could include generating the visual indication 230 based upon the server from which the message was sent. Accordingly, messages from servers indicated on the device as secret or confidential will be displayed with a visual indication of their secret or confidential nature. A basis for the visual indication 230 could also be the identity of the person who sent the message (e.g., the sender identified in the FROM portion of the message). Information about the security/confidentiality nature or level of a server or sender can be stored on the mobile device 100 in a data store. This information can be updated on the mobile device 100 over a network or other data communication link by an IT administrator.

Figure 5:
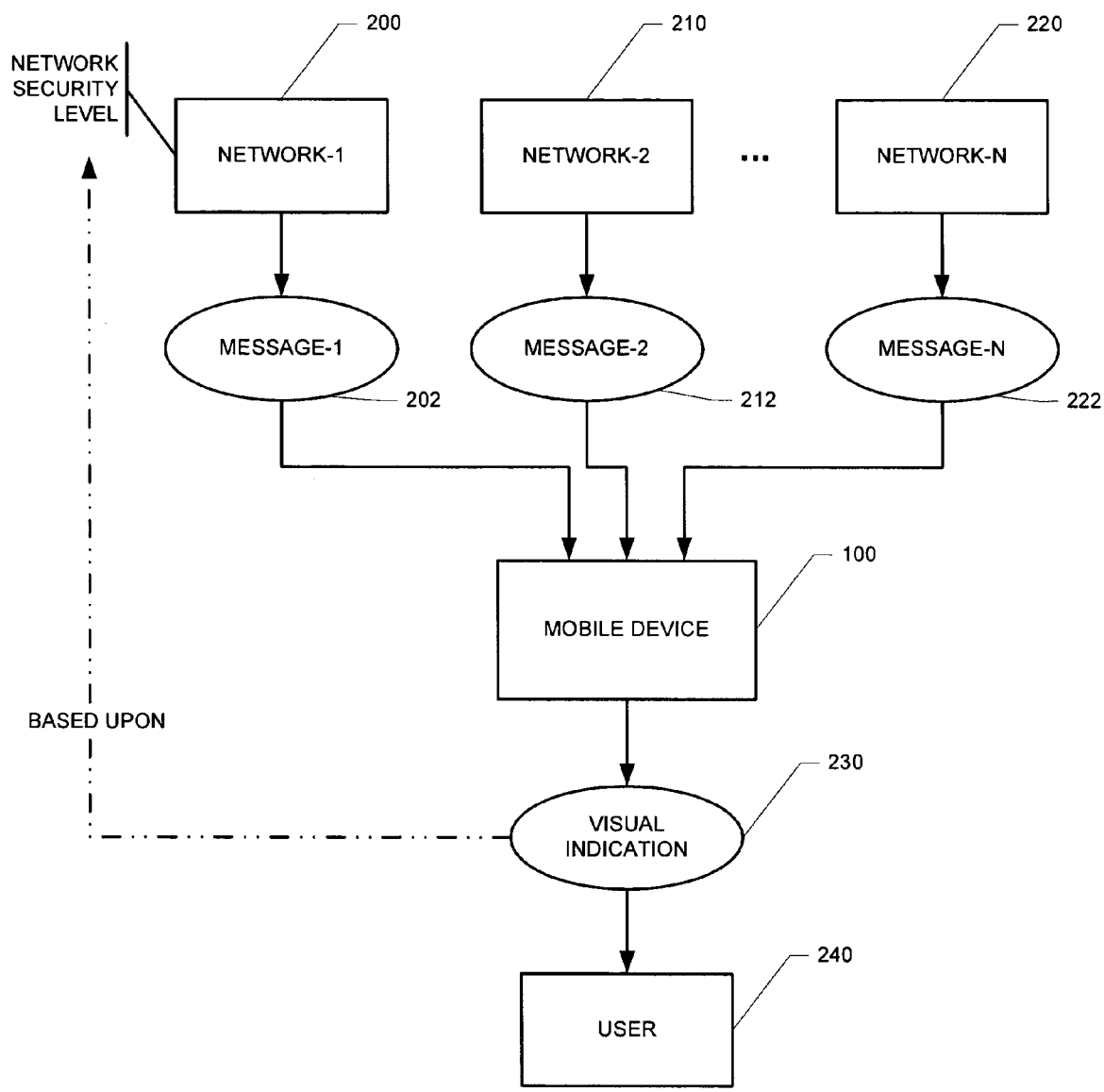
FIG. 5 is a block diagram depicting a visual indication being based upon the security level of a network.

As another example of visual indicators, FIG. 5 illustrates that a visual indication 230 can be based upon the security level of a network. If the first network 200 is a top-security network and the second network 210 is an unrestricted network, then messages from the first network 200 will have a different visual indication 230 than messages from the unrestricted network 210. With the different visual indications 230, messages received from a top-security network can more readily be discerned by a user 240 as such, and thus more likely to be treated properly by the recipient of the message.

Figure 6:
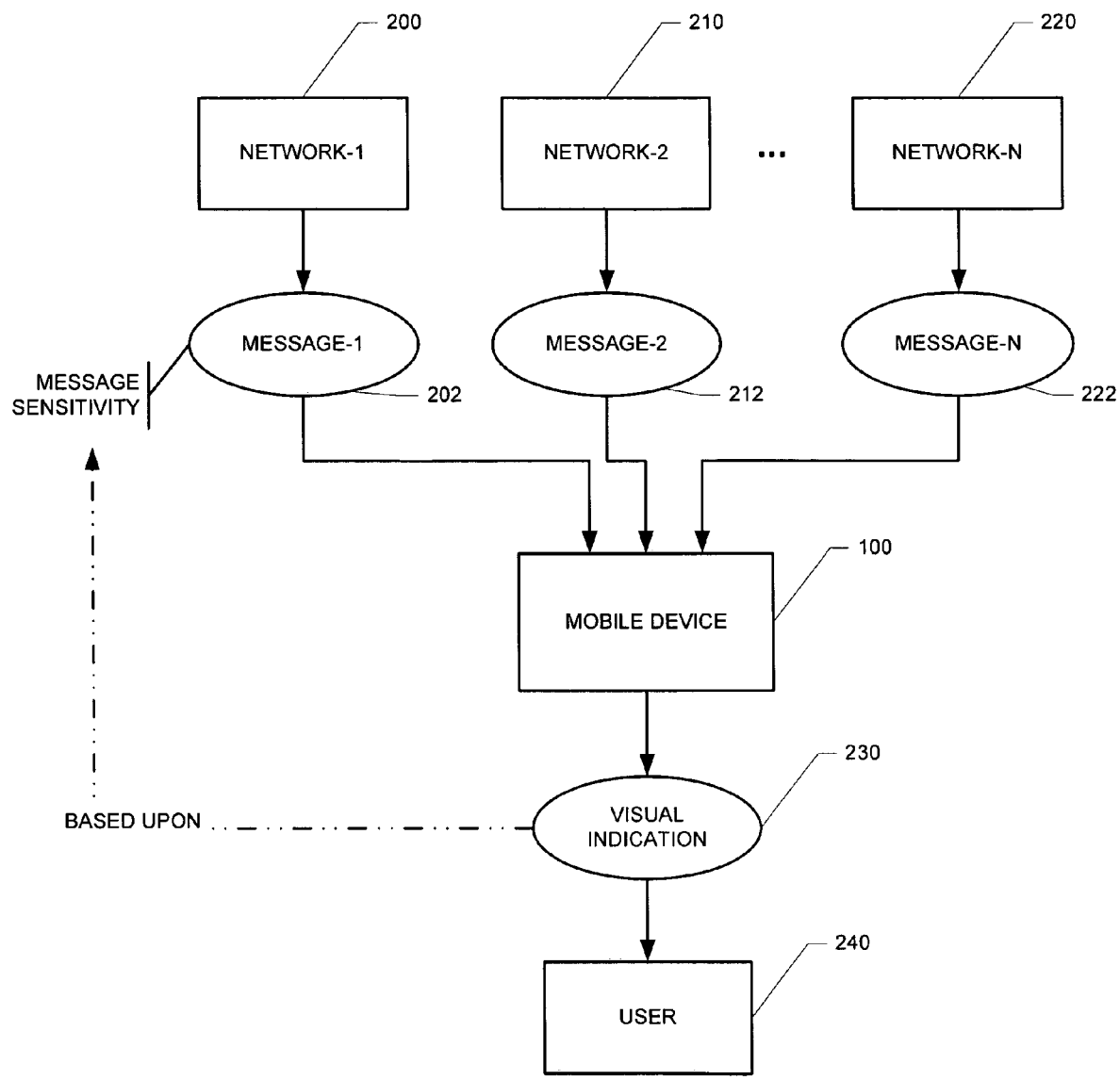
FIG. 6 is a block diagram depicting a visual indication being based upon message sensitivity that is derived from words contained in a received message.

FIG. 6 illustrates that a visual indication 230 can be based upon message sensitivity that is derived from words contained in a received message. A message can directly or indirectly indicate the message sensitivity in a number of different ways, such as the subject line of the message containing the term "TOP SECRET". As another example, the body of the message may contain terms that are listed on the device 100 as indicating a top-secret nature. The list can be updated, such as by an IT administrator.

Figure 7:
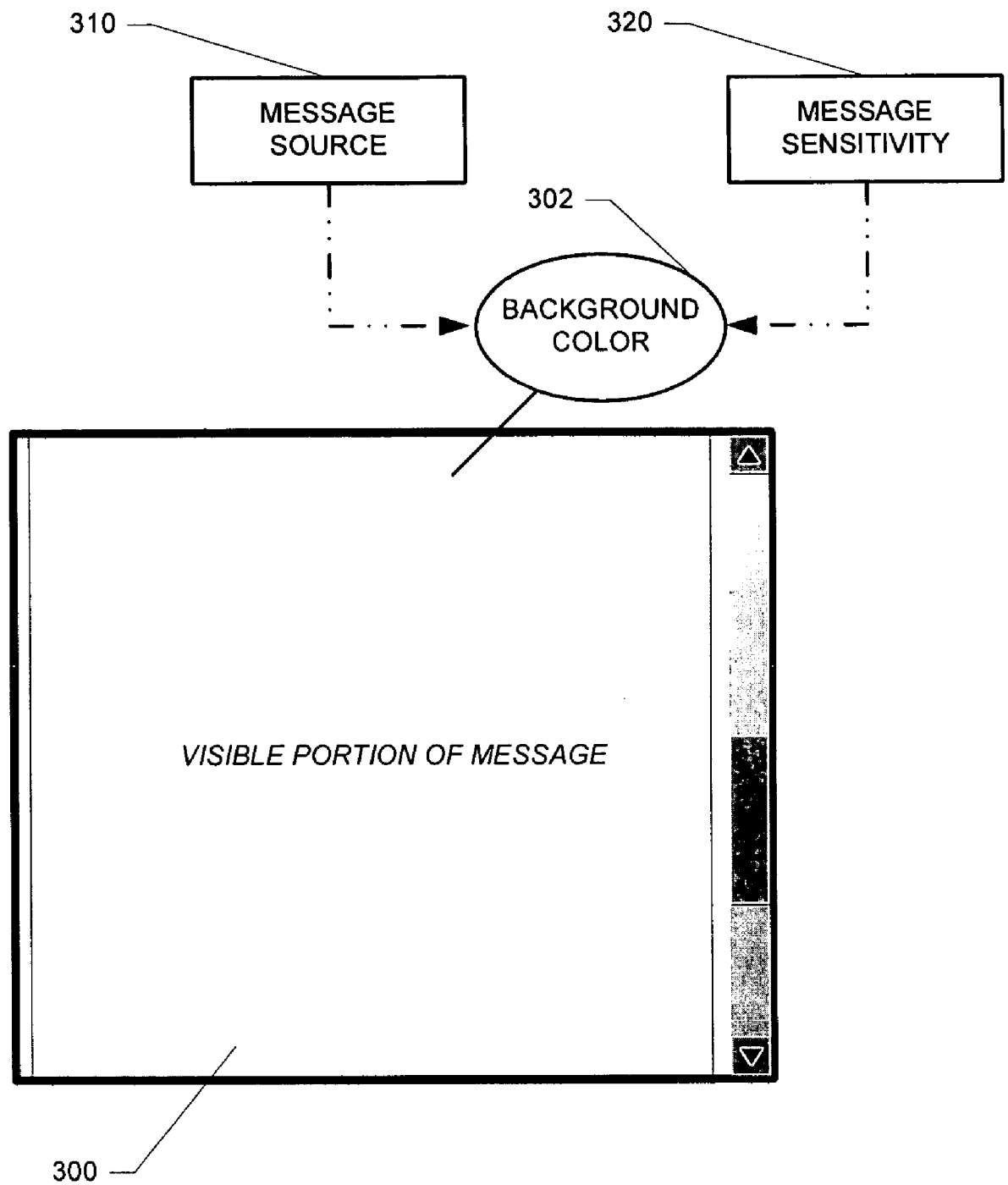
FIG. 7 is a user interface screen that illustrates a visual indicator being the background color.

FIG. 7 depicts a user interface 300 for display to a user of a device. The user interface 300 contains as a visual indicator the background color 302 of the interface 300. The background color 302 of the message can be changed based upon the message source 310 and/or message sensitivity 320 or other message security-related property. For example, top-secret messages can have a red background whenever any part of the message is displayed to the user, and non-secret messages can have a white background. Government agents in the field could quickly be able to tell no matter where they are in the message, which network the message is from, and can react appropriately to the message. It should be understood that such visual indicators are applicable to other environments, such as a corporate environment wherein the color red could be used to indicate a message from the corporate e-mail server, while a different color can be used to indicate an employee's personal home email account.

A visual indicator (e.g., background color, font size, etc.) could be applied to only the body of the displayed message, or could be applied to other parts of the message as well, such as the message "TO" and/or "FROM" and/or "SUBJECT" header lines. The latter aspect effectively prevents an attacker from confusing the recipient of a message as to the message's true sensitivity level or source, if the attacker tries to create a message body whose visual characteristics match or substantially match the visual characteristics utilized by the mobile device to denote message sensitivity, source, etc.

Figure 8:
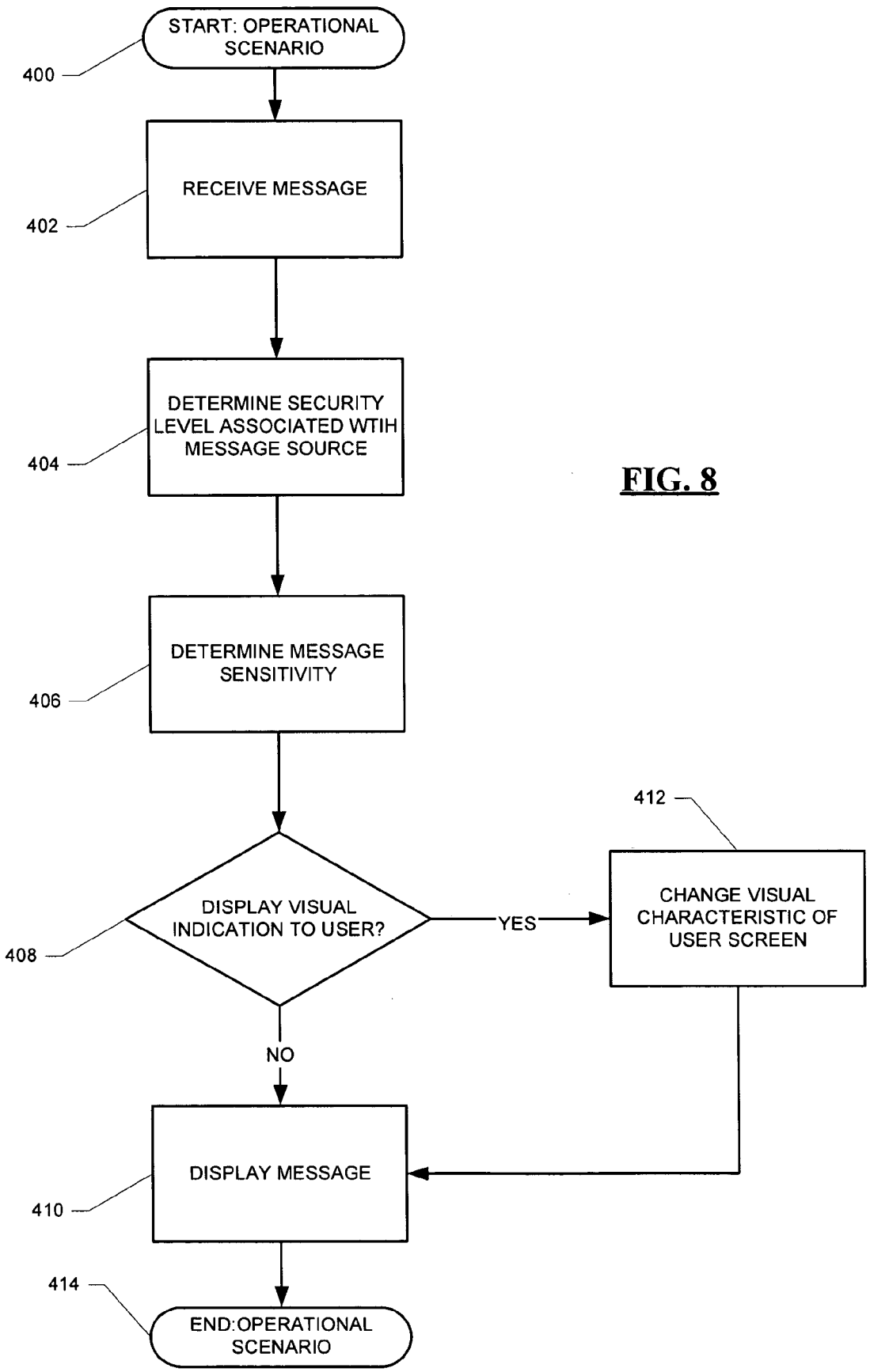
FIG. 8 is a flowchart depicting an operational scenario for displaying visual indicators to a user.

FIG. 8 depicts an operational scenario 400 for displaying visual indicators to a user. At step 402, a device receives a message from a network. At step 404, a security-related aspect of the received message is determined, such as the message sensitivity level which is determined at step 406.

Decision step 408 examines whether a visual indication is to be displayed to a user based upon the one or more determined security-related aspects associated with the received message. If a visual indication is not to be generated as determined at decision step 408, then the message at step 410 is displayed normally (e.g., the background color is not altered) before the operational scenario ends at end block 414. However, if a visual indication is to be generated, step 412 changes one or more visual characteristics of the user screen when the contents of the message are viewed. It should be understood that similar to the other processing flows described herein, the steps and the order of the steps in the flowchart described herein may be altered, modified and/or augmented and still achieve the desired outcome. For example, it should be understood that other visual indicators can be provided to a user, including a mobile device 100 notifying the user whether the message is insecure instead of secure.

Figure 9:
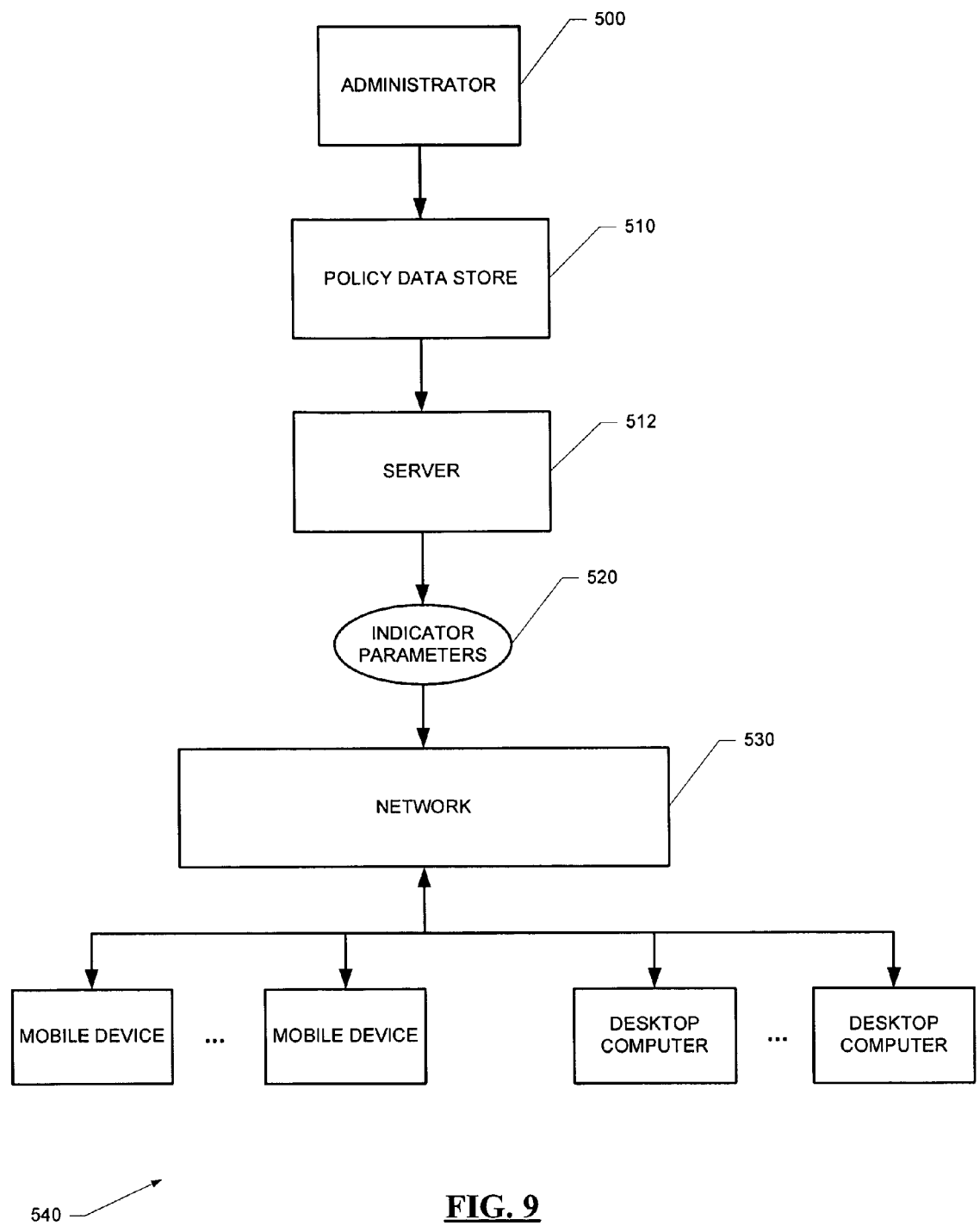
FIG. 9 is a block diagram depicting an IT (information technology) administrator providing visual indicator criterion or settings to a mobile device.

FIG. 9 depicts an IT (information technology) administrator 500 (or its agent) providing visual indicator criterion or settings 520 to a mobile device 100. The settings 520 can indicate what visual characteristics should be altered when handling messages from a particular source and/or with a particular sensitivity level. The settings can be stored in a data store located on the mobile device 100 for access by a software module that generates visual indicators as disclosed herein.

The IT administrator 500 can specify visual indicator settings 520 to one or more devices. The settings 520 may be provided to the mobile device 100 over a network (or other data connection mechanism) in order to update the data store on the mobile device 100. The mobile device 100 can be pre-programmed with the settings and can be updated by the IT administrator 500 or can have the initial settings provided on the mobile device 100 by the IT administrator 500.

This provides, among other things, companies with the capability to customize visual indicator settings to suit their needs. Also, an IT administrator 500 can provide the same settings to all mobile devices of the company or organization, thereby ensuring that company mobile devices adhere to a consistent IT policy.

An IT policy can be enforced upon mobile devices in many ways, such as through the approaches described in the following commonly assigned United States patent application which is hereby incorporated by reference: "System And Method Of Owner Control Of Electronic Devices" (Ser. No. 10/732,132 filed on Dec. 10, 2003). This document illustrates how a user of the mobile device can be prevented from altering or erasing owner control information (e.g., visual indicator settings 520) specified by an IT administrator 500.

Figure 10:
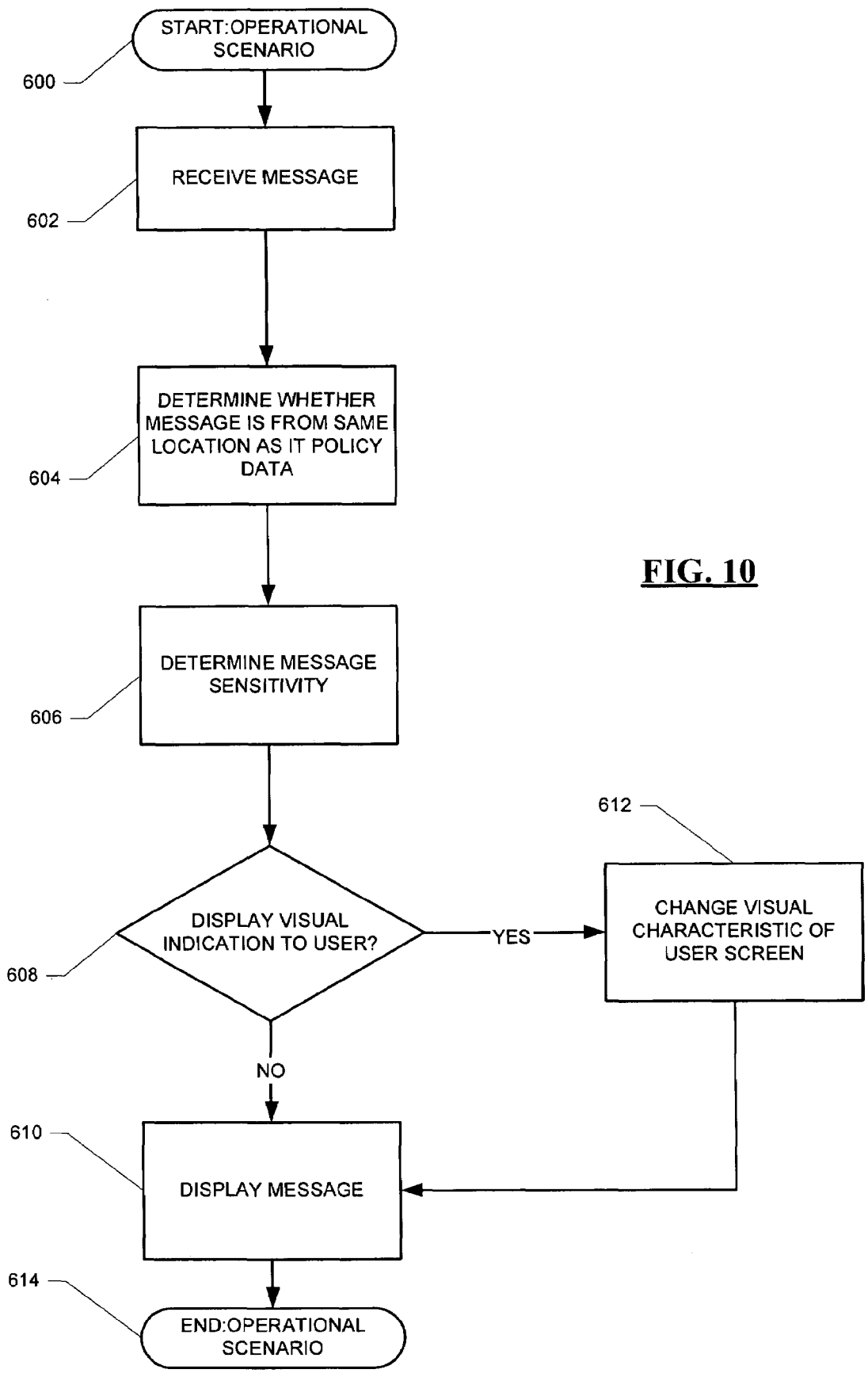
FIG. 10 is a flowchart depicting an operational scenario wherein a visual indicator is generated for a user based upon whether the device receives a message from a service that provided the IT policy settings to the device.

FIG. 10 depicts an operational scenario 600 wherein a visual indicator could be generated for a user based upon whether the device receives a message from a service that provided the IT policy settings to the device 100; in such a situation, the visual characteristic of the display for the received message could be set to that of a higher sensitivity level.

At step 602 of FIG. 10, a message is received by a device. Step 604 determines whether the message is from the same location as the server that sent the IT policy settings to the device. If it has, then step 606 raises the message sensitivity level.

Decision step 608 examines whether a visual indication is to be displayed to a user based upon the determined security-related aspects associated with the received message. If a visual indication is not to be generated as determined at decision step 608 then the message is displayed normally at step 610 before the operational scenario ends at end block 614. However, if a visual indication is to be generated, step 612 changes one or more visual characteristics of the user screen when the contents of the message are viewed. The operational scenario ends at end block 614.

Figure 11:
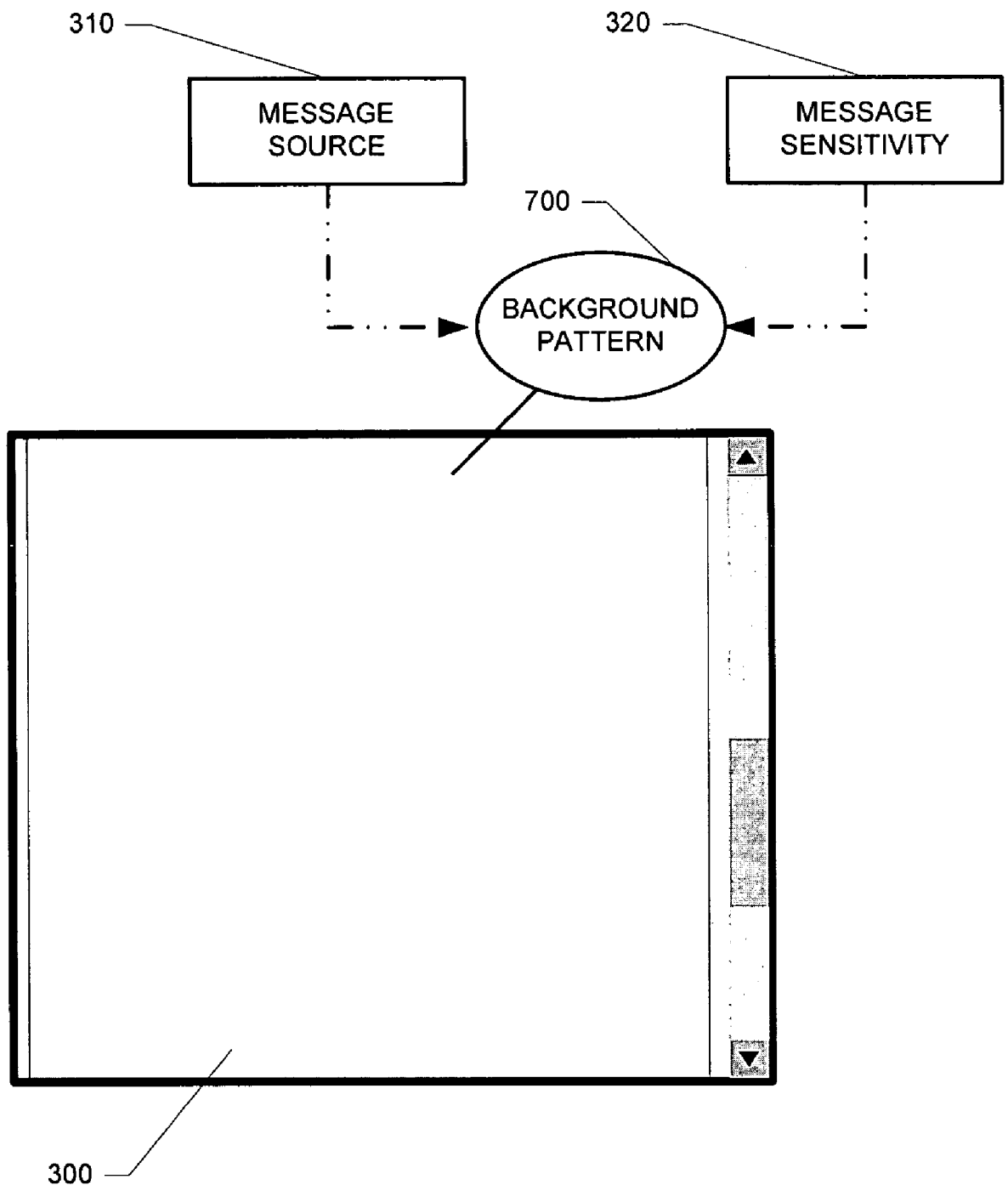
FIG. 11 is a user interface screen illustrating that a visual indicator can utilize different types of visual characteristics for displaying the message.

The systems and methods disclosed herein are presented only by way of example and are not meant to limit the scope of the invention. Other variations of the systems and methods described above will be apparent to those skilled in the art and as such are considered to be within the scope of the invention. For example, a visual indicator can utilize many different types of visual characteristics for displaying the message. As shown in FIG. 11, this can include changing the background pattern 700 based upon the source of the message and/or some other visual characteristic. Still further, the background pattern 700 can be a series of stripes whose intensity can vary over time, thereby further raising the awareness of the user as to the sensitivity level of the message.

Still further, multiple visual indicators can be used on the same mobile device display, such as a first visual indication being used to designate a first feature (e.g., message source) and a second visual indication to designate a second feature (e.g., message sensitivity level) when the message is displayed to a user.

Figure 12:
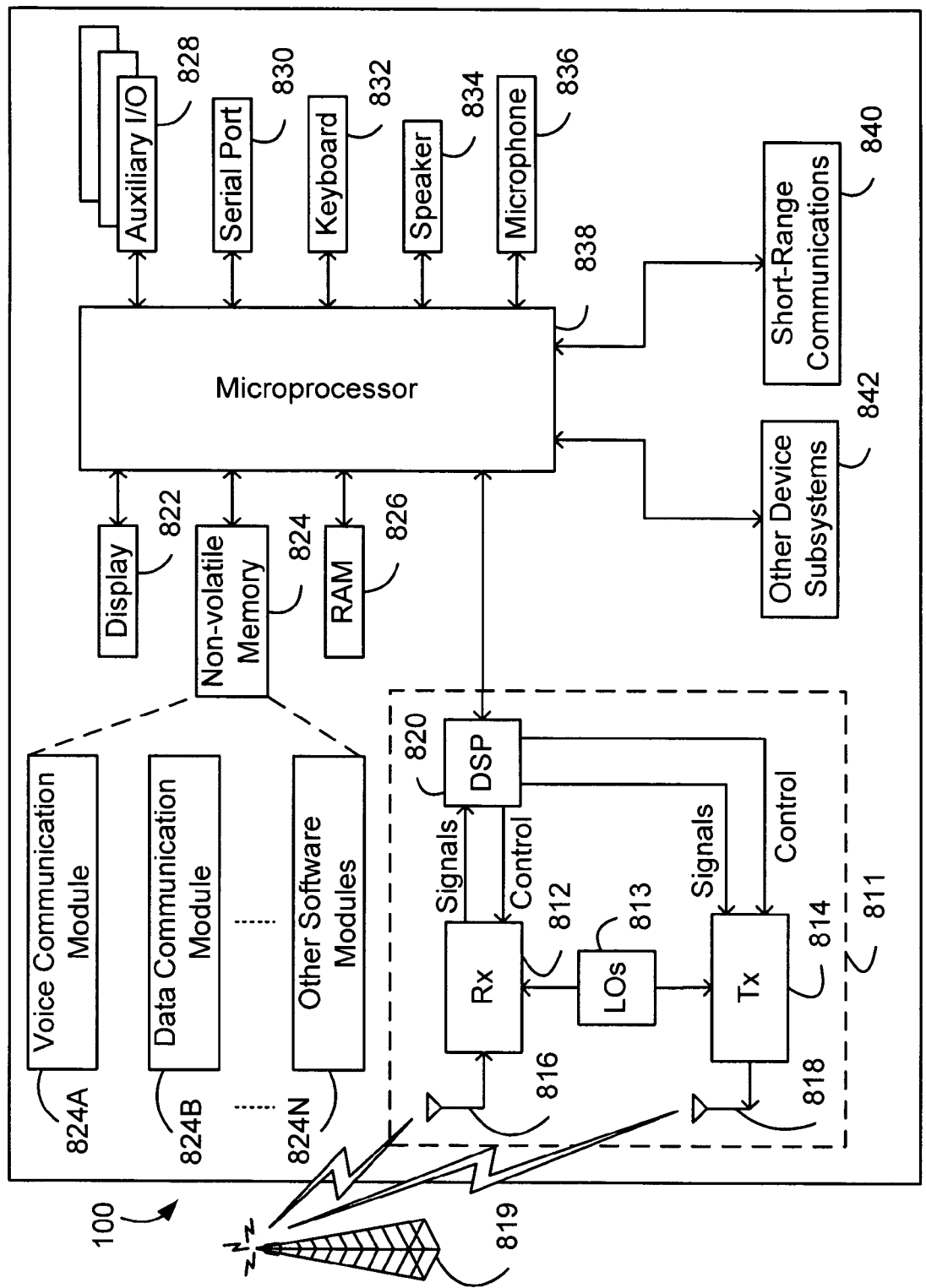
FIG. 12 is a block diagram of an example mobile device.

As another example, the systems and methods disclosed herein may be used with many different computers and devices, such as a personal digital assistant (PDA) or a wireless mobile communications device that is shown in FIG. 12. With reference to FIG. 12, the mobile device 100 is a dual-mode mobile device and includes a transceiver 811, a microprocessor 838, a display 822, non-volatile memory 824, random access memory (RAM) 826, one or more auxiliary input/output (I/O) devices 828, a serial port 830, a keyboard 832, a speaker 834, a microphone 836, a short-range wireless communications sub-system 840, and other device sub-systems 842.

The transceiver 811 includes a receiver 812, a transmitter 814, antennas 816 and 818, one or more local oscillators 813, and a digital signal processor (DSP) 820. The antennas 816 and 818 may be antenna elements of a multiple-element antenna, and are preferably embedded antennas. However, the systems and methods described herein are in no way restricted to a particular type of antenna, or even to wireless communication devices.

The mobile device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 12 by the communication tower 819. These voice and data networks may be separate communication networks using separate infrastructure, such as base stations, network controllers, etc., or they may be integrated into a single wireless network.

The transceiver 811 is used to communicate with the network 819, and includes the receiver 812, the transmitter 814, the one or more local oscillators 813 and the DSP 820. The DSP 820 is used to send and receive signals to and from the transceivers 816 and 818, and also provides control information to the receiver 812 and the transmitter 814. If the voice and data communications occur at a single frequency, or closely-spaced sets of frequencies, then a single local oscillator 813 may be used in conjunction with the receiver 812 and the transmitter 814. Alternatively, if different frequencies are utilized for voice communications versus data communications for example, then a plurality of local oscillators 813 can be used to generate a plurality of frequencies corresponding to the voice and data networks 819. Information, which includes both voice and data information, is communicated to and from the transceiver 811 via a link between the DSP 820 and the microprocessor 838.

The detailed design of the transceiver 811, such as frequency band, component selection, power level, etc., will be dependent upon the communication network 819 in which the mobile device 100 is intended to operate. For example, a mobile device 100 intended to operate in a North American market may include a transceiver 811 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 819, the access requirements for the mobile device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 819, other than any legally required operations, such as '911' emergency calling.

After any required network registration or activation procedures have been completed, the mobile device 100 may the send and receive communication signals, including both voice and data signals, over the networks 819. Signals received by the antenna 816 from the communication network 819 are routed to the receiver 812, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 820. In a similar manner, signals to be transmitted to the network 819 are processed, including modulation and encoding, for example, by the DSP 820 and are then provided to the transmitter 814 for digital to analog conversion, frequency up conversion, filtering, amplification and transmission to the communication network 819 via the antenna 818.

In addition to processing the communication signals, the DSP 820 also provides for transceiver control. For example, the gain levels applied to communication signals in the receiver 812 and the transmitter 814 may be adaptively controlled through automatic gain control algorithms implemented in the DSP 820. Other transceiver control algorithms could also be implemented in the DSP 820 in order to provide more sophisticated control of the transceiver 811.

The microprocessor 838 preferably manages and controls the overall operation of the mobile device 100. Many types of microprocessors or microcontrollers could be used here, or, alternatively, a single DSP 820 could be used to carry out the functions of the microprocessor 838. Low-level communication functions, including at least data and voice communications, are performed through the DSP 820 in the transceiver 811. Other, high-level communication applications, such as a voice communication application 824A, and a data communication application 824B may be stored in the non-volatile memory 824 for execution by the microprocessor 838. For example, the voice communication module 824A may provide a high-level user interface operable to transmit and receive voice calls between the mobile device 100 and a plurality of other voice or dual-mode devices via the network 819. Similarly, the data communication module 824B may provide a high-level user interface operable for sending and receiving data, such as e-mail messages, files, organizer information, short text messages, etc., between the mobile device 100 and a plurality of other data devices via the networks 819.

The microprocessor 838 also interacts with other device subsystems, such as the display 822, the RAM 826, the auxiliary input/output (I/O) subsystems 828, the serial port 830, the keyboard 832, the speaker 834, the microphone 836, the short-range communications subsystem 840 and any other device subsystems generally designated as 842.

Some of the subsystems shown in FIG. 12 perform communication-related functions, whereas other subsystems may provide "resident" or on-device functions. Notably, some subsystems, such as the keyboard 832 and the display 822 may be used for both communication-related functions, such as entering a text message for transmission over a data communication network, and device-resident functions such as a calculator or task list or other PDA type functions.

Operating system software used by the microprocessor 838 is preferably stored in a persistent store such as non-volatile memory 824. The non-volatile memory 824 may be implemented, for example, as a Flash memory component, or as battery backed-up RAM. In addition to the operating system, which controls low-level functions of the mobile device 810, the non-volatile memory 824 includes a plurality of software modules 824A-824N that can be executed by the microprocessor 838 (and/or the DSP 820), including a voice communication module 824A, a data communication module 824B, and a plurality of other operational modules 824N for carrying out a plurality of other functions. These modules are executed by the microprocessor 838 and provide a high-level interface between a user and the mobile device 100. This interface typically includes a graphical component provided through the display 822, and an input/output component provided through the auxiliary I/O 828, keyboard 832, speaker 834, and microphone 836. The operating system, specific device applications or modules, or parts thereof, may be temporarily loaded into a volatile store, such as RAM 826 for faster operation. Moreover, received communication signals may also be temporarily stored to RAM 826, before permanently writing them to a file system located in a persistent store such as the Flash memory 824.

An exemplary application module 824N that may be loaded onto the mobile device 100 is a personal information manager (PIM) application providing PDA functionality, such as calendar events, appointments, and task items. This module 824N may also interact with the voice communication module 824A for managing phone calls, voice mails, etc., and may also interact with the data communication module for managing e-mail communications and other data transmissions. Alternatively, all of the functionality of the voice communication module 824A and the data communication module 824B may be integrated into the PIM module.

The non-volatile memory 824 preferably also provides a file system to facilitate storage of PIM data items on the device. The PIM application preferably includes the ability to send and receive data items, either by itself, or in conjunction with the voice and data communication modules 824A, 824B, via the wireless networks 819. The PIM data items are preferably seamlessly integrated, synchronized and updated, via the wireless networks 819, with a corresponding set of data items stored or associated with a host computer system, thereby creating a mirrored system for data items associated with a particular user.

Context objects representing at least partially decoded data items, as well as fully decoded data items, are preferably stored on the mobile device 100 in a volatile and non-persistent store such as the RAM 826. Such information may instead be stored in the non-volatile memory 824, for example, when storage intervals are relatively short, such that the information is removed from memory soon after it is stored. However, storage of this information in the RAM 826 or another volatile and non-persistent store is preferred, in order to ensure that the information is erased from memory when the mobile device 100 loses power. This prevents an unauthorized party from obtaining any stored decoded or partially decoded information by removing a memory chip from the mobile device 100, for example.

The mobile device 100 may be manually synchronized with a host system by placing the device 100 in an interface cradle, which couples the serial port 830 of the mobile device 100 to the serial port of a computer system or device. The serial port 830 may also be used to enable a user to set preferences through an external device or software application, or to download other application modules 824N for installation. This wired download path may be used to load an encryption key onto the device, which is a more secure method than exchanging encryption information via the wireless network 819. Interfaces for other wired download paths may be provided in the mobile device 100, in addition to or instead of the serial port 830. For example, a USB port would provide an interface to a similarly equipped personal computer.

Additional application modules 824N may be loaded onto the mobile device 100 through the networks 819, through an auxiliary I/O subsystem 828, through the serial port 830, through the short-range communications subsystem 840, or through any other suitable subsystem 842, and installed by a user in the non-volatile memory 824 or RAM 826. Such flexibility in application installation increases the functionality of the mobile device 100 and may provide enhanced on-device functions, communication-related functions, or both. For example, secure communication applications may enable electronic commerce functions and other such financial transactions to be performed using the mobile device 100.

When the mobile device 100 is operating in a data communication mode, a received signal, such as a text message or a web page download, is processed by the transceiver module 811 and provided to the microprocessor 838, which preferably further processes the received signal in multiple stages as described above, for eventual output to the display 822, or, alternatively, to an auxiliary I/O device 828. A user of mobile device 100 may also compose data items, such as e-mail messages, using the keyboard 832, which is preferably a complete alphanumeric keyboard laid out in the QWERTY style, although other styles of complete alphanumeric keyboards such as the known DVORAK style may also be used. User input to the mobile device 100 is further enhanced with a plurality of auxiliary I/O devices 828, which may include a thumbwheel input device, a touchpad, a variety of switches, a rocker input switch, etc. The composed data items input by the user may then be transmitted over the communication networks 819 via the transceiver module 811.

When the mobile device 100 is operating in a voice communication mode, the overall operation of the mobile device is substantially similar to the data mode, except that received signals are preferably be output to the speaker 834 and voice signals for transmission are generated by a microphone 836. Alternative voice or audio I/O subsystems, such as a voice message recording subsystem, may also be implemented on the mobile device 100. Although voice or audio signal output is preferably accomplished primarily through the speaker 834, the display 822 may also be used to provide an indication of the identity of a calling party, the duration of a voice call, or other voice call related information. For example, the microprocessor 838, in conjunction with the voice communication module and the operating system software, may detect the caller identification information of an incoming voice call and display it on the display 822.

A short-range communications subsystem 840 is also included in the mobile device 100. The subsystem 840 may include an infrared device and associated circuits and components, or a short-range. RF communication module such as a Bluetooth™ module or an 802.11 module, for example, to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless local area networks, respectively.

The systems' and methods' data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

It is claimed

1. A method for operation upon a data processing device for handling messages with different levels of security, comprising:

examining an attribute of a message received over a network in order to determine a security-related level associated with the message;

generating a visual indication for display to a device user that is indicative of the determined security-related level;

wherein the generated visual indication is configured to be visible during a scrolling throughout the text associated with the message;

wherein the generated visual indication is applied to a display portion presenting a body of the text associated with the message;

wherein the generated visual indication is configured to be displayed throughout the text;

wherein the step of generating the visual indication includes changing a background pattern of the device display whose intensity varies over time.

2. The method of claim 1, wherein the device is a wireless mobile communications device that receives messages over a wireless communication network.

3. The method of claim 1, wherein a security-related level includes at least a security type selected from the group of a confidential security-related level, sensitive security-related level, secret security-related level, and unrestricted security-related level.

4. The method of claim 1, wherein a first visual indicator generated for a first security type is visually different than a second visual indicator generated for a second security type.

5. The method of claim 4, wherein the step of generating of the visual indicator is selected from the following group of visual indicators: changing background of a device display to indicate the security-related level associated with a message; changing a background pattern of the device display to include a series of stripes whose intensity varies over time; changing a font size of the message text to indicate the security-related level associated with the message; and combination thereof.

6. The method of claim 1, wherein a first message is provided to the device from a first network, wherein a second message is provided to the device from a second network, wherein the first and second networks have different security degrees, wherein the examined message attribute is the network that provided the message, wherein the visual indication is indicative of the degree of security associated with the network which provided the message to the device.

7. The method of claim 1, wherein a first message is provided to the device from a first server, wherein a second message is provided to the device from a second server, wherein the first and second servers have different security degrees, wherein the examined message attribute is the server that provided the message, wherein the visual indication is indicative of the degree of security associated with the server which provided the message to the device.

8. The method of claim 1, wherein a first message is provided to the device from a first sender, wherein a second message is provided to the device from a second sender, wherein identities of the first and second senders have different security degrees, wherein the examined message attribute includes sender identity, wherein the visual indication is indicative of the degree of security associated with the sender of the message to the device.

9. The method of claim 1, wherein information about the security-related level of a message attribute is stored on a data store on the device and update data is provided by an administrator over a data communication link to the device, wherein the update data is used to update the information stored on the device related to handling the security-related level of the message attribute.

10. The method of claim 9, wherein the administrator provides visual indicator settings to the device, wherein the settings indicate what visual characteristics are to be altered when handling messages from different sources.

11. The method of claim 9, wherein the administrator provides to multiple devices owned by a company visual indicator settings to the device, wherein the settings indicate what visual characteristics are to be altered when handling messages from different sources.

12. The method of claim 1, wherein the visual indication is generated responsive to the content of a subject line associated with the message.

13. The method of claim 1, wherein multiple visual indicators are generated for a message for display on device, such that the first visual indicator is used to designate a security-related level associated with a first message attribute and a second visual indicator is used to designate a security-related level associated with a second message attribute when the message is displayed to a user.

14. A data processing device for handling messages with different levels of security, comprising:
- a receiver configured to receive a message via a network;
- security logic instructions operable to examine an attribute of the message to determine a security-related level associated with the message; and
- user interface logic instructions configured to generate a visual indication for display to a device user and to be responsive to the determined security-related level associated with the message, the generated visual indication being configured to be visible during scrolling throughout the message text;
- wherein the generated visual indication is applied to a display portion presenting a body of the text associated with the message;
- wherein the generated visual indication is configured to be displayed throughout the text;
- wherein generating the visual indication includes changing a background pattern of the user interface whose intensity varies over time.

15. The device of claim 14, wherein the data processing device is a wireless mobile communications device that receives messages over a wireless communication network.

16. The device of claim 14, wherein the security-related level includes at least a security type selected from the group of: a confidential security-related level, sensitive security-related level, secret security-related level, and unrestricted security-related level.

17. The device of claim 14, wherein a first visual indicator generated for a first security type is visually different than a second visual indicator generated for a second security type.

18. The device of claim 17, wherein the visual indicator generated is selected from the following group of visual indicators: changing background of a device display to indicate the security-related level associated with a message; changing a background pattern of the device display to include a series of stripes whose intensity varies over time; changing a font size of the message text to indicate the security-related level associated with the message; and combination thereof.

19. The device of claim 14, wherein the visual indication is generated responsive to the content of a subject line associated with the message.

20. The device of claim 14, wherein the security logic instructions are configured to determine a security-related level associated with the message responsive to at least an attribute selected from the group:
- an originating network associated with the message, wherein different networks are associated with different security degrees;
- a server from which the message was received, wherein different servers are associated with different security degrees; or,
- a sender associated with the message, wherein different senders are associated with different security degrees.

21. The device of claim 14, wherein information about the security-related level of a message attribute is stored on a data store on the device and update data is provided by an administrator over a data communication link to the device, wherein the update data is used to update the information stored on the device related to handling the security-related level of the message attribute.

22. The device of claim 21, wherein the administrator provides visual indicator settings to the device, wherein the settings indicate what visual characteristics are to be altered when handling messages from different sources.

23. The device of claim 22, wherein the administrator provides to multiple devices owned by a company visual indicator settings to the device, wherein the settings indicate what visual characteristics are to be altered when handling messages from different sources.

24. The device of claim 14, wherein multiple visual indicators are generated for a message for display on device, such that the first visual indicator is used to designate a security-related level associated with a first message attribute and a second visual indicator is used to designate a security-related level associated with a second message attribute when the message is displayed to a user.

25. One or more computer readable media having software program code stored thereon for facilitating the handling of messages with different levels of security at a data processing device, the software program code comprising:

first instructions for receiving a message via a network;

second instructions for examining an attribute of the message to determine a security-related level associated with the message; and third instructions for generating a visual indication for display to a display associated with the data processing device, the visual indication being generated responsive to the determined security-related level associated with the message, and being configured to be visible during scrolling throughout the message text;

wherein the generated visual indication is applied to a display portion presenting a body of the text associated with the message;

wherein the generated visual indication is configured to be displayed throughout the text;

wherein generating the visual indication includes changing a background pattern of the display whose intensity varies over time.

* * * * *

UNITED STATES PATENT AND TRADEMARK OFFICE
CERTIFICATE OF CORRECTION

PATENT NO. : 7,627,757 B2 Page 1 of 1
APPLICATION NO. : 11/066406
DATED : December 1, 2009
INVENTOR(S) : Adams et al.

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 1114 days.

Column 13, line 63, delete "operable" and insert --configured--.

Signed and Sealed this

Thirty-first Day of August, 2010

David J. Kappos
*Director of the United States Patent and Trademark Office*